US012673763B2

(12) United States Patent
    Block et al.

(10) Patent No.: US 12,673,763 B2
(45) Date of Patent: Jul. 7, 2026

(54) FASTENING SYSTEM FOR AIRCRAFT STRUCTURES

(71) Applicant: The Boeing Company, Chicago, IL (US)

(72) Inventors: Samuel L. Block, Seattle, WA (US); John A. Davies, Renton, WA (US); Ian E. Schroeder, Seattle, WA (US)

(73) Assignee: The Boeing Company, Arlington, VA (US)

( * ) Notice: Subject to any disclaimer, the term of this patent is extended or adjusted under 35 U.S.C. 154(b) by 213 days.

(21) Appl. No.: 17/331,379

(22) Filed: May 26, 2021

(65) Prior Publication Data

US 2022/0001973 A1      Jan. 6, 2022

Related U.S. Application Data

(60) Provisional application No. 63/047,723, filed on Jul. 2, 2020.

(51) Int. Cl.
    *B64C 3/26*      (2006.01)
    *B64F 5/10*      (2017.01)
    *F16B 5/02*      (2006.01)
    *F16B 37/14*      (2006.01)
    *F16B 43/00*      (2006.01)

(52) U.S. Cl.
    CPC .................. *B64C 3/26* (2013.01); *B64F 5/10* (2017.01); *F16B 5/0208* (2013.01); *F16B 37/145* (2013.01); *F16B 2043/008* (2013.01)

(58) Field of Classification Search
    CPC .. B64C 3/26; B64F 5/10; F16B 5/0208; F16B 37/145; F16B 2043/008
    See application file for complete search history.

(56) References Cited

U.S. PATENT DOCUMENTS

| | | | |
|---|---|---|---|
| 2,673,050 A | 3/1954 | Patch |
| 2,828,093 A | 3/1958 | Kaplan |
| 2,828,094 A | 3/1958 | Hildebrand |
| 2,924,418 A | 2/1960 | Edward |
| 3,194,517 A | 7/1965 | Morris |
| 3,547,382 A | 12/1970 | Stanley |

(Continued)

FOREIGN PATENT DOCUMENTS

| | | |
|---|---|---|
| GB | 2569315 | 6/2019 |
| JP | 2019-105344 | 6/2019 |

OTHER PUBLICATIONS

European Patent Office, "Extended European Search Report", issued in connection with European Patent Application No. 21181708.5, Jan. 12, 2021, (9 pages).

(Continued)

*Primary Examiner* — Nirvana Deonauth
(74) *Attorney, Agent, or Firm* — Hanley, Flight & Zimmerman, LLC

(57) ABSTRACT

A fastening system to couple a first aircraft structure and a second aircraft structure is disclosed. The fastening system includes a fastener, a nutplate having a body defining an opening to receive the fastener, a flange extending from the body to engage an outer surface of the first structure, and a first sleeve protruding from the flange in a direction away from the body, the first sleeve to couple to a first bore formed in the first structure and prevents rotation of the nutplate relative to the first structure.

14 Claims, 11 Drawing Sheets

(56) References Cited

U.S. PATENT DOCUMENTS

| | | | | |
|---|---|---|---|---|
| 3,670,998 | A | 6/1972 | Charleville | |
| 3,768,759 | A | 10/1973 | Martin | |
| 4,375,281 | A | 3/1983 | Nichols | |
| 4,755,904 | A * | 7/1988 | Brick | F16B 19/05 244/1 A |
| 5,175,665 | A * | 12/1992 | Pegg | F16B 33/004 411/542 |
| 5,205,516 | A | 4/1993 | Bright | |
| 5,746,561 | A | 5/1998 | Nygren, Jr. et al. | |
| 6,296,429 | B1 * | 10/2001 | Wright | F16B 31/021 411/3 |
| 6,796,528 | B2 | 9/2004 | Wood | |
| 7,591,622 | B2 | 9/2009 | de Jesus et al. | |
| 8,061,656 | B1 | 11/2011 | Renn | |
| 9,669,942 | B2 | 6/2017 | Khosravani et al. | |
| 11,220,322 | B2 | 1/2022 | Walter | |
| 11,447,022 | B2 | 9/2022 | Bernhardt et al. | |
| 2011/0033260 | A1 * | 2/2011 | Miura | B23K 35/0288 219/98 |
| 2014/0234050 | A1 | 8/2014 | Asahara et al. | |
| 2016/0297542 | A1 | 10/2016 | Khosravani et al. | |
| 2018/0057142 | A1 | 3/2018 | Wilkerson | |
| 2019/0106195 | A1 | 4/2019 | Wilkerson | |
| 2019/0161206 | A1 * | 5/2019 | Dobbin | B64D 45/02 |
| 2019/0176961 | A1 | 6/2019 | Tulloch et al. | |
| 2021/0197691 | A1 | 7/2021 | Stefanopoulou | |

OTHER PUBLICATIONS

"Forcetec Rivetless Nut Plates," Fatigue Tech, Retrieved on May 25, 2021, Retrieved from the Internet <https://fatiguetech.com/products/forcetec-rivetless-nut-plates#Brochures-Images-amp-Specs> 9 pages.

"World Leaders in Expanded Products," Fatigue Tech, Retrieved on May 25, 2021, Retrieved from the Internet <https://fatiguetech.com/products/forcetec-rivetless-nut-plates#Brochures-Images-amp-Specs> 8 pages.

"ForceTec," Fatigue Tech, Retrieved on May 25, 2021, Retrieved from the Internet <https://fatiguetech.com/products/forcetec-rivetless-nut-plates#Brochures-Images-amp-Specs> 6 pages.

"ForceTec Lite," Fatigue Tech, Retrieved on May 25, 2021, Retrieved from the Internet <https://fatiguetech.com/products/forcetec-rivetless-nut-plates#Brochures-Images-amp-Specs> 2 pages.

"Expanded Products in Composites," Fatigue Tech, Retrieved on May 25, 2021, Retrieved from the Internet <https://fatiguetech.com/products/forcetec-rivetless-nut-plates#Brochures-Images-amp-Specs> 6 pages.

United States Patent and Trademark Office, "Notice of Allowance," issued in connection with U.S. Appl. No. 16/869,035, mailed on Oct. 6, 2021, 7 pages.

United States Patent and Trademark Office, "Notice of Allowance," issued in connection with U.S. Appl. No. 16/869,191, mailed on May 18, 2022, 7 pages.

European Patent Office, "Communication pursuant to Article 94(3) EPC", issued in connection with European Patent Application No. 21181708.5, Mar. 7, 2023, 6 pages.

Canadian Intellectual Property Office, "Requisition by the Examiner," issued in connection with Canadian Patent Application No. 3,123,442, dated Jan. 30, 2024, 5 pages.

Canadian Intellectual Property Office, "Examination Report," issued in connection with Canadian Patent Application No. 3,123,442, dated Jan. 30, 2025, 5 pages.

European Patent Office, "Communication under Rule 71(3) EPC," issued in connection with European Patent Application No. 3,123,442, dated Mar. 13, 2024, 47 pages.

China National Intellectual Property Administration, "First Office Action", issued in connection with CN Patent Application No. 202110738319.4 on Mar. 18, 2025, 22 pages (English Translation Included).

China National Intellectual Property Administration, "Office Action", issued in connection with CN Patent Application No. 202110738319.4 on Jul. 30, 2025, 22 pages (English Translation Included).

* cited by examiner

110

110

900

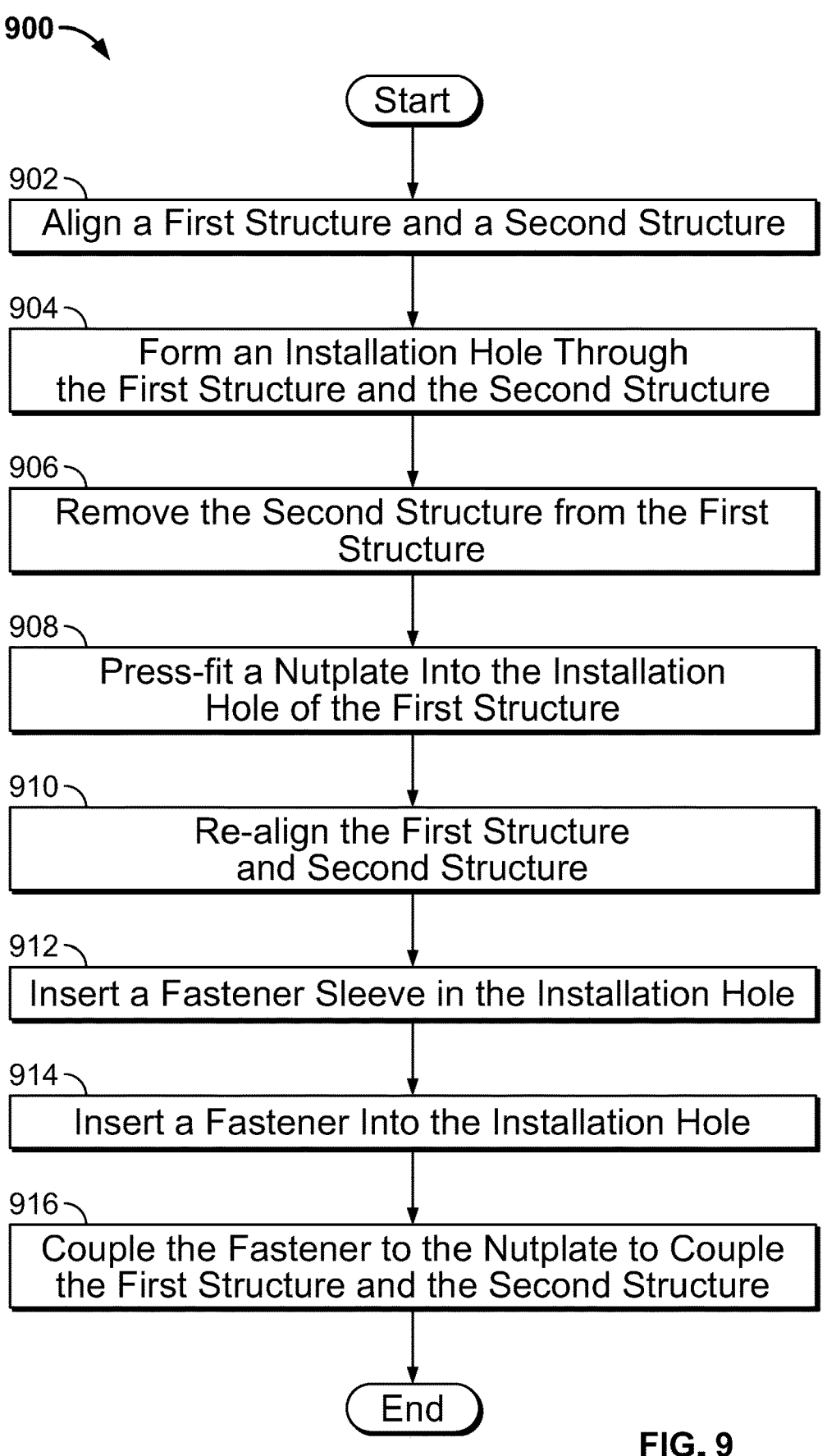

Start

902 — Align a First Structure and a Second Structure

904 — Form an Installation Hole Through
the First Structure and the Second Structure 906 — Remove the Second Structure from the First
Structure 908 — Press-fit a Nutplate Into the Installation
Hole of the First Structure 910 — Re-align the First Structure
and Second Structure 912 — Insert a Fastener Sleeve in the Installation Hole 914 — Insert a Fastener Into the Installation Hole 916 — Couple the Fastener to the Nutplate to Couple
the First Structure and the Second Structure End

FIG. 9

FASTENING SYSTEM FOR AIRCRAFT STRUCTURES

RELATED APPLICATION

This patent claims the benefit of U.S. Provisional Patent Application No. 63/047,723, filed Jul. 2, 2020, entitled "FASTENING SYSTEM FOR AIRCRAFT STRUC- TURES." The entire disclosure of U.S. Provisional Patent Application No. 63/047,723 is hereby incorporated by ref- erence in its entirety.

FIELD

The present disclosure relates generally to aircraft and, more particularly, to a fastening system for aircraft struc- tures.

BACKGROUND

Aircraft employ different types of fasteners to couple two or more structural components. However, access to struc- tural components can be limited, requiring personnel or mechanics to perform confined space work to install and/or torque a fastener of a fastening system.

SUMMARY

An example fastening system to couple a first structure and a second structure includes a fastener, a nutplate having a body defining an opening to receive the fastener, a flange extending from the body to engage an outer surface of the first structure, and a first sleeve protruding from the flange in a direction away from the body, the first sleeve to couple to a first bore formed in the first structure and prevent rotation of the nutplate relative to the first structure.

An example aircraft includes a wingbox defining a struc- ture including one or more spar chords, stringers and ribs, a close-out panel to close the wingbox, and a fastener assem- bly to couple the close-out panel and the wingbox. The fastener assembly includes a nutplate having a body and a first sleeve extending away from the body in a direction along a longitudinal axis of the body, the first sleeve to be press-fit in a first bore of the structure to prevent rotation of the nutplate relative to the structure, the nutplate configured to prevent rotation of the nutplate about the longitudinal axis relative to the structure when the nutplate is coupled to the structure. The fastener assembly also includes a fastener to couple to the nutplate via a second bore formed in the close-out panel to couple the close-out panel and the struc- ture.

An example method includes aligning a close-out panel of an aircraft with a structure of an aircraft, forming a bore through the close-out panel and the structure, removing the close-out panel from the structure after forming the bore, inserting a nutplate to a first portion of the bore formed in the structure, re-aligning the close-out panel with the structure, inserting a sleeve in a second portion of the bore formed in the close-out panel, inserting a fastener in the second portion of the bore formed in the close-out panel from an exterior surface of the close-out panel, and coupling the fastener to the nutplate via the second portion of the bore to secure the close-out panel to the structure.

BRIEF DESCRIPTION OF THE DRAWINGS

FIG. 9 is an example method to assemble a first structure and a second structure of the example wing using the example fastening system of FIGS. 4A-4B, 5A-5B, 7, and 8A-8B.

Figure 1:
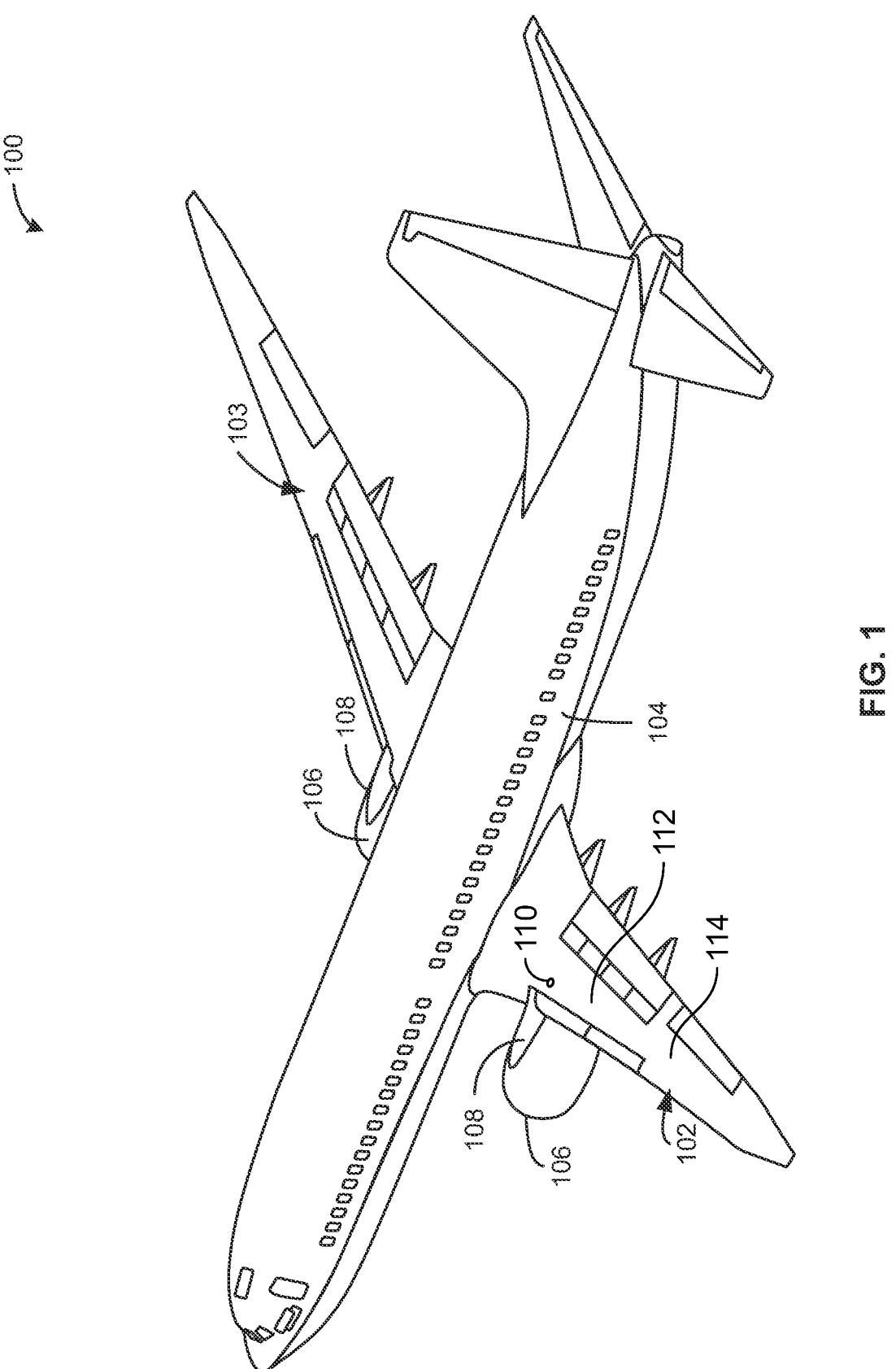
FIG. 1 is a perspective view of an example aircraft in which aspects of the present disclosure may be imple- mented.

Wherever possible, the same reference numbers will be used throughout the drawing(s) and accompanying written description to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Aircraft employ fastening systems or fasteners to secure a first structure (e.g., an aircraft wall, a cover panel, a close-out panel, a wing skin, etc.) and a second structure (e.g., a stringer, a spar chord, a rib of an aircraft frame, etc.). Known fastening systems include a nutplate used in com- bination with a threaded screw or bolt to secure the first structure (e.g., the close-out panel) and the second structure (e.g., a spar chord of the wingbox). However, during aircraft assembly, the assembly areas can become confined and limited, which increases manufacturing complexity. For example, a close-out panel, when coupled to a wingbox, reduces access to an area or cavity within the wingbox. Aircraft technicians often have to enter a cavity of the wingbox through an access opening (e.g., an access opening located at a bottom of the wing) to perform confined space work to install and/or torque fasteners of the close-out panel, install hydraulic system, install fuel systems, seal fuel tank, apply lightning strike protection sealant, cleaning, systems testing, etc. However, confined space fastener installation is particularly time-consuming because such fastener installation requires installation in the extremities of every single rib bay in the wing).

Some existing fastening systems (e.g., nutplates) can be configured to reduce confined space work conditions. For example, some known fastening systems employ secondary self-retention features (e.g., small diameter rivets) for securing the nutplate within an installation hole of a structure (e.g., a rib) to react a torque (e.g., restrict or reduce rotation) applied to the nutplate when threadably coupling a bolt to the nutplate. In some examples, such secondary self-retention features include rivets, pins or other features used to secure the nutplate after the nutplate is installed or coupled to a structure. However, such existing nutplates have not been used due to cost, weight, complexity and/or ineffectiveness of the secondary self-retention features. For example, small diameter rivets increase installation costs. Further, adding rivets increases direct lightning strike concerns by forming additional pathways to an interior of a wingbox, requiring addition of a sealant (e.g., cap seals) for lightning direct strike protection. Addition of such sealant after a fastening system is installed requires confined space work because mechanics or personnel need to access the fastening system (e.g., the nutplate and rivets) from within the wingbox (e.g., after installation of a closeout panel) to apply the sealant. Additionally, such known sealant significantly increases aircraft weight. In other examples, nutplates are cold-worked as a secondary operation to radially expand the nutplate in an installation hole to achieve an interference fit. However, cold-working as a secondary operation increases manufacturing costs and reduces manufacturing efficiency. As such, aircraft do not employ existing fastening systems as they increase airplane weight, manufacturing complexity and/or costs.

Example fastening systems for aircraft disclosed herein facilitate installation in confined work spaces and provide lightning direct strike protection. Specifically, example fastening systems disclosed herein do not require aircraft mechanics to perform confined space work to install and/or torque a fastener. For example, fastening systems disclosed herein eliminate confined space work needed for a mechanic to enter a wingbox to install and/or torque a fastener of a close-out panel (e.g., a close-out panel of a carbon fuel-carrying primary structure wingbox). Additionally, fastening systems disclosed herein can employ a conductive coating as a finish applied to an exterior surface of the fastening system parts, thereby increasing conductivity where the parts contact and/or gap each other. Other features of the fastening systems disclosed herein (e.g., a dome-shaped nutplate, etc.), in combination with the conductive coating, do not require separate application of a sealant for lightning direct strike protection after installation of the fastening system to a structural assembly.

Example fastening systems disclosed herein employ a nutplate used in combination with a threaded bolt to secure a first structure (e.g., a spar chord of the wingbox) and a second structure (e.g., a close-out panel). An example nutplate disclosed herein includes a unitary or one-piece body. The nutplate includes an integral construction with a dome, a flange or shoulder, and a sleeve (e.g., a circumferential leg) extending from the dome. The sleeve provides an integral self-retention feature that prevents rotation of the nutplate about a longitudinal axis when coupled to an installation hole of a structure. In other words, no additional fasteners or secondary self-retention features such as rivets, pins, etc., are needed to enable the nutplate to react a torque (e.g., rotation) applied to the nutplate. To prevent rotation of the nutplate, the integral self-retention feature includes a sleeve that couples to an installation hole of a structure via an interference fit. Thus, the example fasteners disclosed herein eliminate the need for rivets or other self-retention features to retain the nutplate. Additionally, installation of the nutplate can be provided prior to the addition of a close-out panel, thereby eliminating personnel from having to access a cavity of a frame (e.g., a wingbox) to react a torque from a fastener after installation of the close-out panel. Instead, a mechanic can torque a fastener of the fastening system after the close-out panel is coupled to the frame from an exterior of the frame (e.g., without having personnel access a cavity of the frame) because the integral self-retention feature of the nutplate reacts a torque from the fastener and prevents rotation of the nutplate about its longitudinal axis when a fastener is coupled to the nutplate. Additionally, the fastening systems disclosed herein include a conductive coating to provide lightning direct strike protection that can be applied during fabrication of the fastening system. The combination of the conductive coating with the direct lightning strike protection features of the fastening system disclosed herein (e.g., domed nutplate, a groove for fuel isolation from fastener assembly, etc.) eliminates the need for application of a sealant after installation of the fastening system. The example fastening systems disclosed herein significantly reduce manufacturing costs and/or improve manufacturing efficiency by eliminating the need for confined space work and/or reduce aircraft weight and manufacturing costs associated with application of a sealant after installation of the fastening system.

FIG. 1 illustrates an example aircraft 100 in which the examples disclosed herein can be implemented. The aircraft 100 includes a fuselage 104 and wings 102, 103 extending laterally outward from the fuselage 104. Each of the wings 102, 103 of the illustrated example supports an aircraft engine 106 via a pylon 108. In the examples disclosed herein, a fastening system 110 (e.g., a fastener assembly) disclosed herein secures or couples airplane structures associated with the wings 102, 103. For example, the fastening system 110 of FIG. 1 couples a close-out panel 112 (e.g., a wing skin 114) to the wing 102. Only one fastening system 110 is shown in FIG. 1 for illustrative purposes. However, the wing 102 (e.g., the close-out panel 112) can include a plurality of fastening systems 110 to attach the close-out panel 112 to the wing 102. Although FIG. 1 illustrates that the fastening system 110 is used to couple the close-out panel 112 and the wing 102, the fastening system 110 disclosed herein can be used to secure any other structures of the aircraft 100. Further, the wing 103 is similar to the wing 102. For example, the wing 103 also includes an example fastening system (e.g., the fastening system 110). For brevity, the wing 103 is not discussed further herein. Additionally, the aircraft 100 of FIG. 1 is a commercial aircraft. However, the fastening system 110 disclosed herein can be employed with unmanned vehicles (e.g., drones), military vehicles, marine vehicles, automobiles, other structures, and/or any frame(s) or structure(s). Further, the fastening system 110 disclosed herein is not limited to aircraft-specific structures. In some examples, the fastening system 110 can be employed to couple any other type(s) of structure(s) or frame(s) (e.g., box frames, housing, etc.).

Figure 2A:
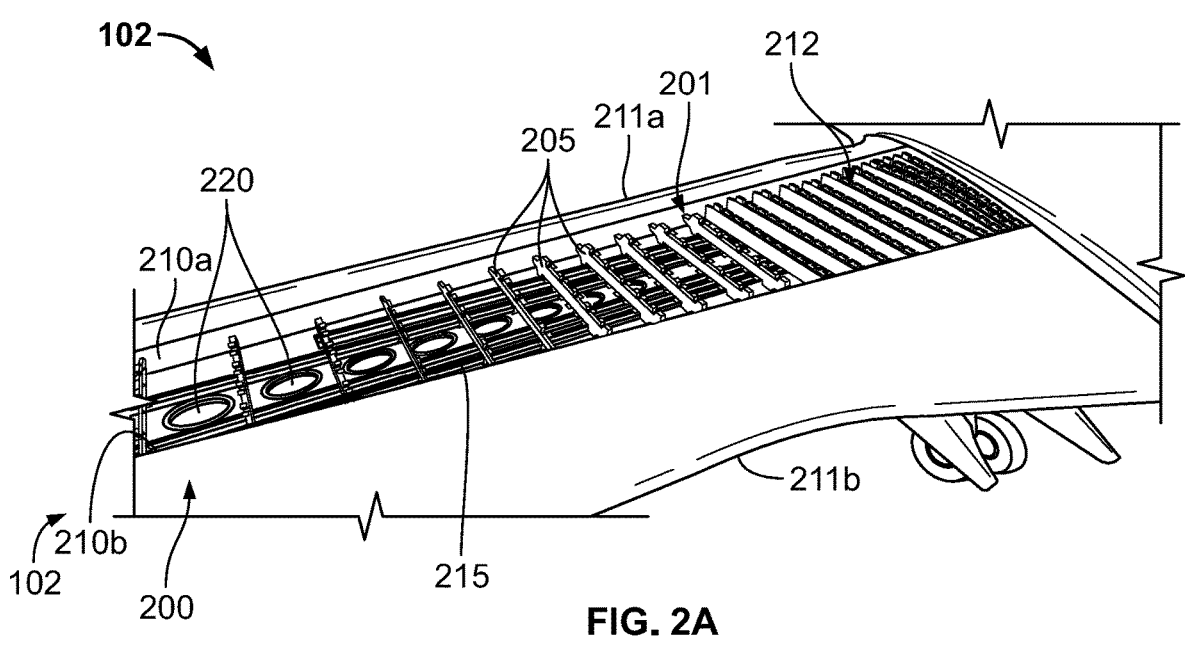
FIG. 2A is a perspective view of an example wing with an upper close-out panel and other components removed to show wing sub-structure of the example aircraft of FIG. 1.
Figure 2A:
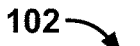
Figure 2B:
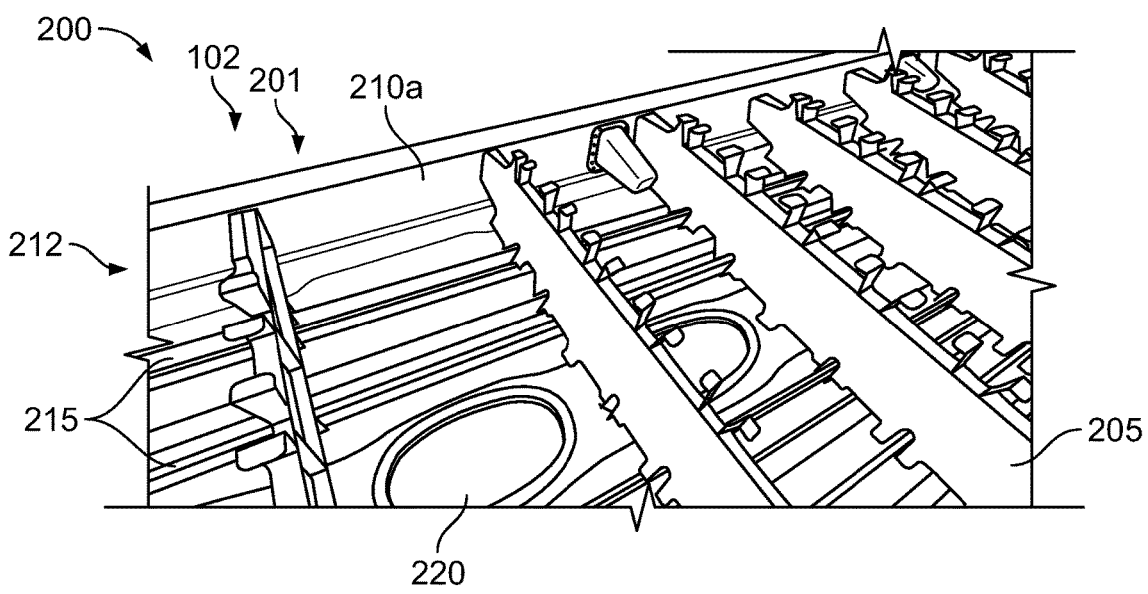
FIG. 2B is an enlarged, partial perspective view of the example wing of FIG. 2A.

FIG. 2A is a perspective view of the example wing 102 of the example aircraft of FIG. 1 with an upper close-out panel and other components removed to show wing sub-structure. FIG. 2B is an enlarged, partial view of the example wing 102 of FIG. 2A. The close-out panel 112 is not shown in FIGS. 2A and 2B. The first wing 102 has an example wingbox 200 that includes structural components 201 that support and/or shape the wing 102. The structural components 201 include load-bearing components that are structured or configured to withstand shear and/or bending moments acting on the wing 102 during loading conditions (e.g., lift). For example, the wingbox 200 includes a plurality of ribs 205 extending in a spar chordwise direction. Additionally, the wingbox 200 includes a front spar 210a (e.g., adjacent a leading edge 211a of the wing 102), a rear spar 210b (e.g., adjacent a trailing edge 211b of the wing 102) and a plurality of stringers 215 extending in a spanwise direction. The ribs 205 maintain an aerodynamic profile of the wing 102 and can be spaced relative (e.g., equidistant) to one another (e.g., repeated at frequent or equidistant intervals to form a skeletal shape of the wing 102). For example, the ribs 205 form part of a boundary of the wingbox 200 onto which the wing skin 114 (FIG. 1) is attached and support the wing skin 114 to prevent the wing skin 114 from buckling. The ribs 205 attach to the front spar 210a and the rear spar 210b that extend across the length of the wing 102 in the spanwise direction (e.g., between a wing root and a wing tip) and provide strength to the wing 102 by counteracting torsion and upward bending forces when the wing 102 generates lift. The stringers 215 carry axial loads resulting from bending moments in the wing 102. The wing 102 forms a cavity 212 that can be used to store fuel. To permit access to the cavity 212 of the wingbox 200, the wing 102 includes one or more access openings 220. For example, the access openings 220 allow mechanics and/or personnel to perform confined space work within the cavity 212 of the wing 102 after attachment or assembly of the close-out panel 112 to the wingbox 200.

Figures 3A, 3B:
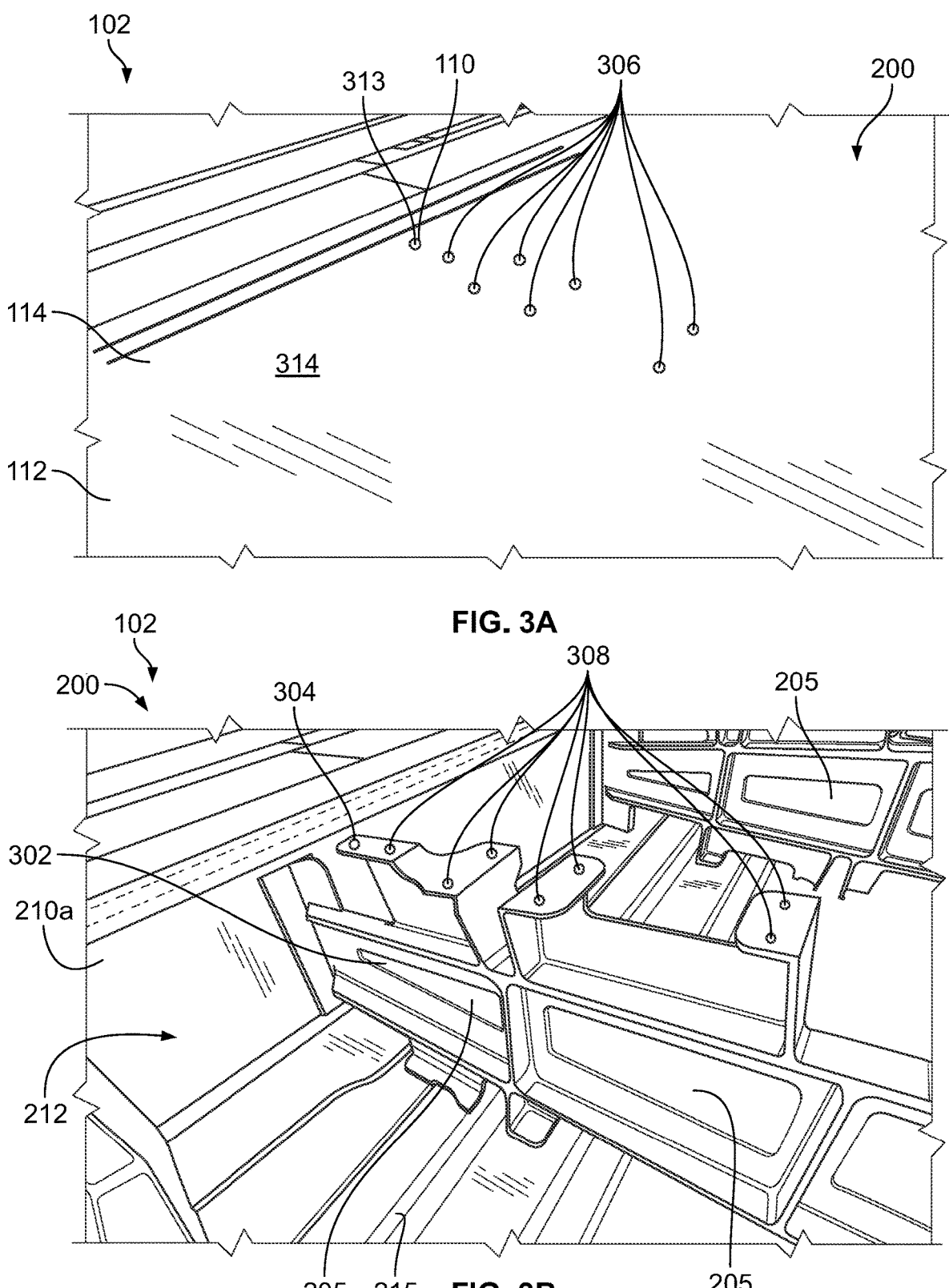
FIG. 3A is a perspective, enlarged view of the example wing of FIG. 2B, including a close-out panel secured to the example wing via an example fastening system disclosed herein.
FIG. 3B is a perspective view of the example wing of FIG. 3A shown with the close-out panel removed.

FIG. 3A is a perspective view of the example wing 102 of FIG. 1. The wing 102 of FIG. 3A includes the close-out panel 112 secured to the wing 102 via the example fastening system 110. FIG. 3B is a perspective, enlarged view of the example wing 102 of FIG. 3A shown without the close-out panel 112. Referring to FIGS. 3A and 3B, during assembly of the aircraft 100, the close-out panel 112 (e.g., the wing skin 114) is installed and fastened to the wingbox 200 via the fastening system 110 to form the wing 102 of FIG. 1. To install the close-out panel 112 to the wingbox 200, a rib 302 includes a first opening 304 (e.g., a through hole, a first bore) to receive the fastening system 110. When coupled to the wing 102, a fastener head 313 of the fastening system 110 is positioned along (e.g., exposed from) an exterior surface 314 (e.g., an outer or external surface) of the close-out panel 112 and other portions of the fastening system 110 are located within the cavity 212 of the wingbox 200. In other words, only the fastener head 313 (e.g., a bolt head) of the fastening system 110 is exposed to the exterior surface 314 (e.g., an exterior) of the wing 102. Additionally, as described in detail below, the fastening system 110 can be torqued (e.g., via the fastener head 313) when the close-out panel 112 is attached to the wingbox 200 and without requiring personnel to access the cavity 212 via the access openings 220 (FIGS. 2A and 2B). As noted above, the aircraft 100 includes a plurality of fastening systems 306 to secure the close-out panel 112 to the wingbox 200. For example, to install the close-out panel 112 to the wingbox 200, the ribs 205 include a plurality of openings 308 to receive respective ones of the fastening systems 306. Thus, each of the openings 308 receives a respective one of the fastening systems 306 to couple the close-out panel 112 to the wingbox 200. The fastening systems 306 are identical to the fastening system 110 and, for brevity, will not be further discussed. Although not shown, the close-out panel 112 can be secured to other aircraft structure(s) such as, for example, the front spar 210a, the rear spar 210b, the stringers 215, and/or other frame members via the fastening system 110 and/or the fastening systems 306.

Figure 4A:
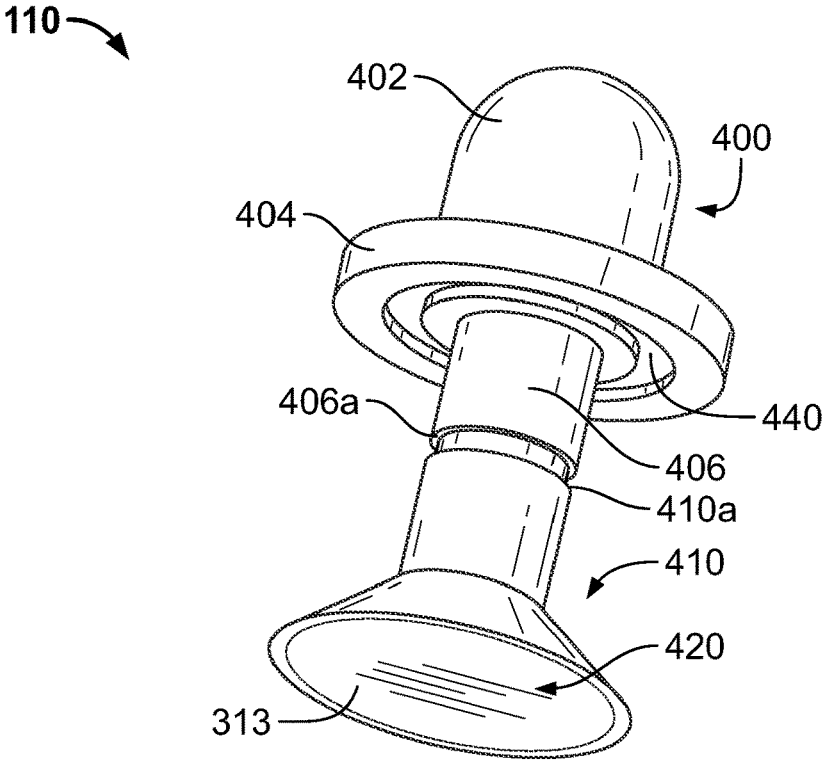
FIG. 4A is an assembled, perspective view of the example fastening system disclosed herein.
Figure 4B:
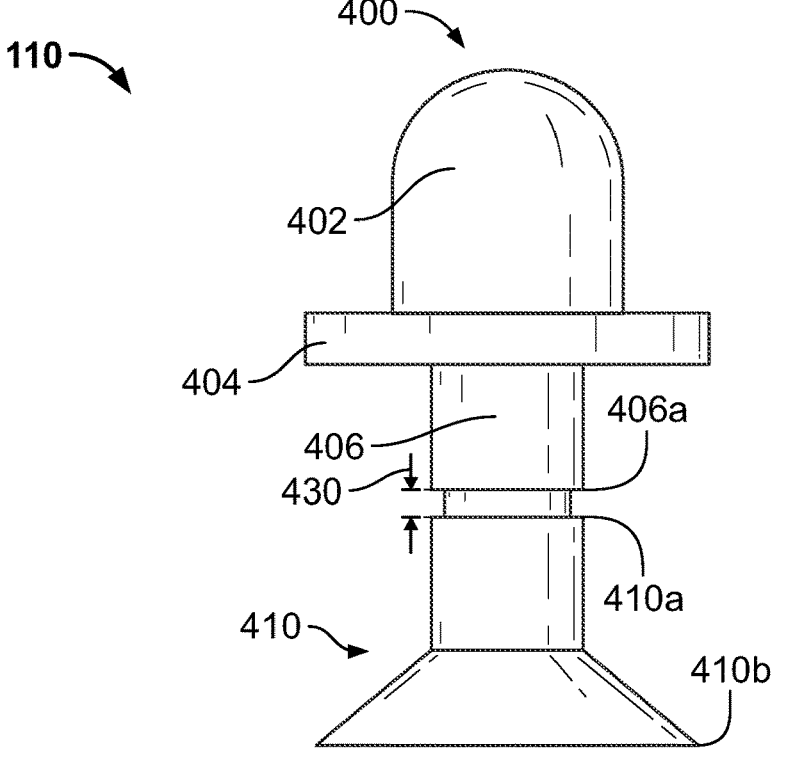
FIG. 4B is an assembled, front view of the example fastening system of FIG. 4A.

FIG. 4A is a perspective view of the fastening system 110 of FIGS. 1 and 3A. FIG. 4B is a side view of the fastening system 110 of FIGS. 1, 3A and 4A. The fastening system 110 can implement each of the fastening systems 306 of FIG. 3B. Referring to FIGS. 4A and 4B, the fastening system 110 includes an example nutplate 400, an example fastener sleeve 410 (e.g., a second sleeve), and an example fastener 420. The nutplate 400 includes an example body 402 having an example nutplate flange 404 and a base sleeve 406 (e.g., a first sleeve). The base sleeve 406 provides an integral self-retention feature. The nutplate flange 404 extends radially from the body 402 and the base sleeve 406 extends in a direction (e.g., in a longitudinal direction) away from the body 402. Additionally, the nutplate flange 404 includes an example groove 440 (e.g., an annular groove) between a peripheral edge of the nutplate flange 404 and the base sleeve 406. Additionally, the body 402 of the nutplate 400 of the illustrated example has a dome-shape. However, in other examples, the nutplate 400 can have any other shape (e.g., a cylindrical shape, a rectangular shape, etc.). The body 402, the nutplate flange 404, and the base sleeve 406 of the illustrated example are integrally formed as a unitary piece or single structure.

When the fastening system 110 is assembled, the fastener sleeve 410 and the base sleeve 406 receive (e.g., slidably receive) the fastener 420 such that the fastener sleeve 410 and the base sleeve 406 surround (e.g., encase) at least a portion of the fastener 420. Additionally, a first fastener sleeve edge 410a is spaced from a base sleeve edge 406a to form a gap 430. Further, the fastener head 313 of the fastener 420 is surrounded by the fastener sleeve 410. For example, the fastener head 313 is flush mounted relative to a second fastener sleeve edge 410b opposite the first fastener sleeve edge 410a. In some examples, the fastener head 313 can be recessed within the fastener sleeve 410 or may extend past (e.g., above or beyond) the second fastener sleeve edge 410b. Additionally, the fastening system 110 (e.g., the nutplate 400, the fastener sleeve 410, and the fastener 420) includes a conductive coating (e.g., indium coating, a teflon coating, etc.). The conductive coating can be applied to the fastening system 110 prior to installation of the fastening system 110 to the wing 102. Such a conductive coating, in combination with features of the fastening system disclosed herein (e.g., domed nutplate, etc.) eliminates any further sealant (e.g., a cap seal) otherwise needed to provide lightning strike protection. The fastener sleeve 410 is used in a countersunk fastener installation, such that the fastener head 313 is positioned within (e.g., countersunk relative to) and/or flush mounted relative the fastener sleeve 410.

Figure 5A:
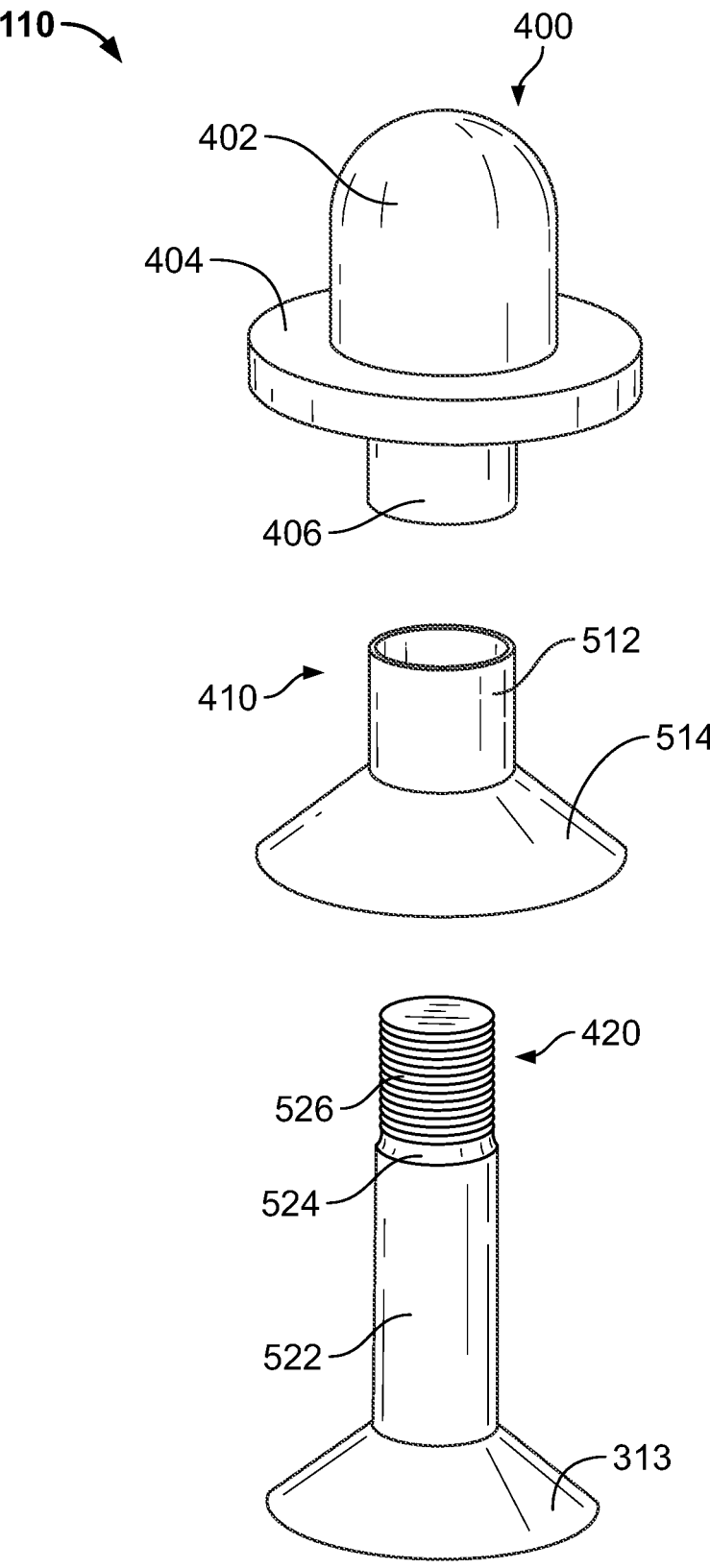
FIG. 5A is an exploded view of the example fastening system of FIG. 4A.
Figure 5B:
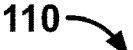
FIG. 5B is an exploded, cross-sectional view of the example fastening system of FIG. 5A.
Figure 5B:
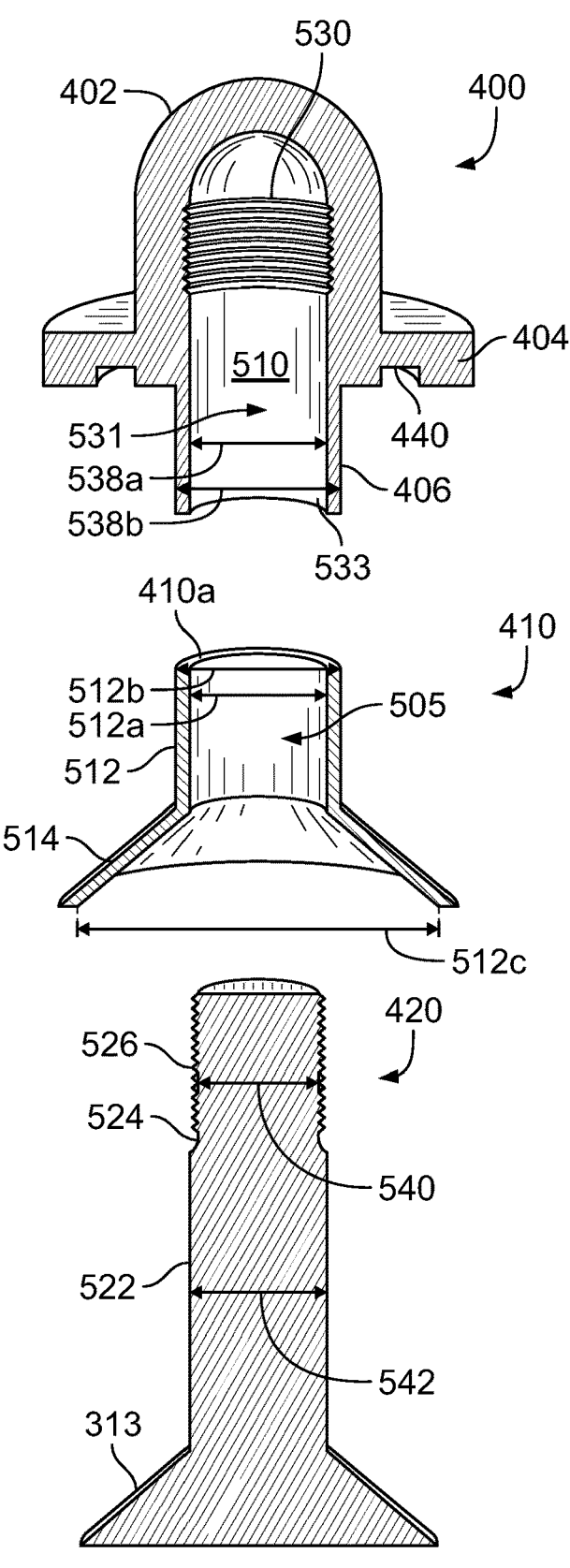

FIG. 5A is an exploded view of the example fastening system 110 of FIGS. 1, 3B, 4A and 4B. FIG. 5B is an exploded cross-sectional view of the fastening system 110 of FIG. 5A. Referring to FIGS. 5A and 5B, the fastener 420 is a bolt. For example, the fastener 420 includes a threaded portion 526 and a non-threaded portion or shank 522. The outer diameter 540 of the threaded portion 526 is smaller than the outer diameter 542 of the non-threaded portion or shank 522. In some examples, a length of the non-threaded portion or shank 522 can be the same as a length corresponding to a stack-up thickness of the aircraft structures to be assembled. In some examples, the fastener 420 includes a thread relief 524 below the threaded portion 526 for a fastener thread rolling run-out.

The body 402 and the base sleeve 406 of the nutplate 400 define an opening 510 to receive the fastener 420. Specifically, a portion of the opening 510 defined by the body 402 includes a threaded portion or internal threads 530 to receive the threads of the threaded portion 526 of the fastener 420 when the fastener 420 couples to the nutplate 400. A portion of the opening 510 defined by the base sleeve 406 defines a non-threaded portion 531 (e.g., a smooth surface) to receive (e.g., slidably receive) the shank 522 of the fastener 420. Thus, the internal threads 530 are positioned in the body 402 of the nutplate flange 404 and an inner surface 533 of the base sleeve 406 does not include internal threads. The opening 510 has an inner diameter 538a and the base sleeve 406 has an outer diameter 538b. The base sleeve 406 of the illustrated example has a cylindrical shape. However, in some examples, an outer shape or surface of the base sleeve 406 can be a square shape, a rectangular shape, and/or any other suitable shape (e.g., non-circular, elliptical, etc.).

The fastener sleeve 410 includes a top sleeve 512 and a bottom sleeve 514 that define an opening 505 (e.g., a through hole) to receive (e.g., slidably receive) the fastener 420 (e.g., the shank 522). The top sleeve 512 has a cylindrical shape and the bottom sleeve 514 flares or tapers from the top sleeve 512 to define a conical. The top sleeve 512 has an inner diameter 512a and an outer diameter 512b. The bottom sleeve 514 has an inner diameter 512c that is greater than the inner diameter 512a of the top sleeve 512. The bottom sleeve 514 has a shape that is complementary to the shape of the fastener head 313 to enable the fastener head 313 to be flush-mounted with the fastener sleeve 410.

Figure 6:
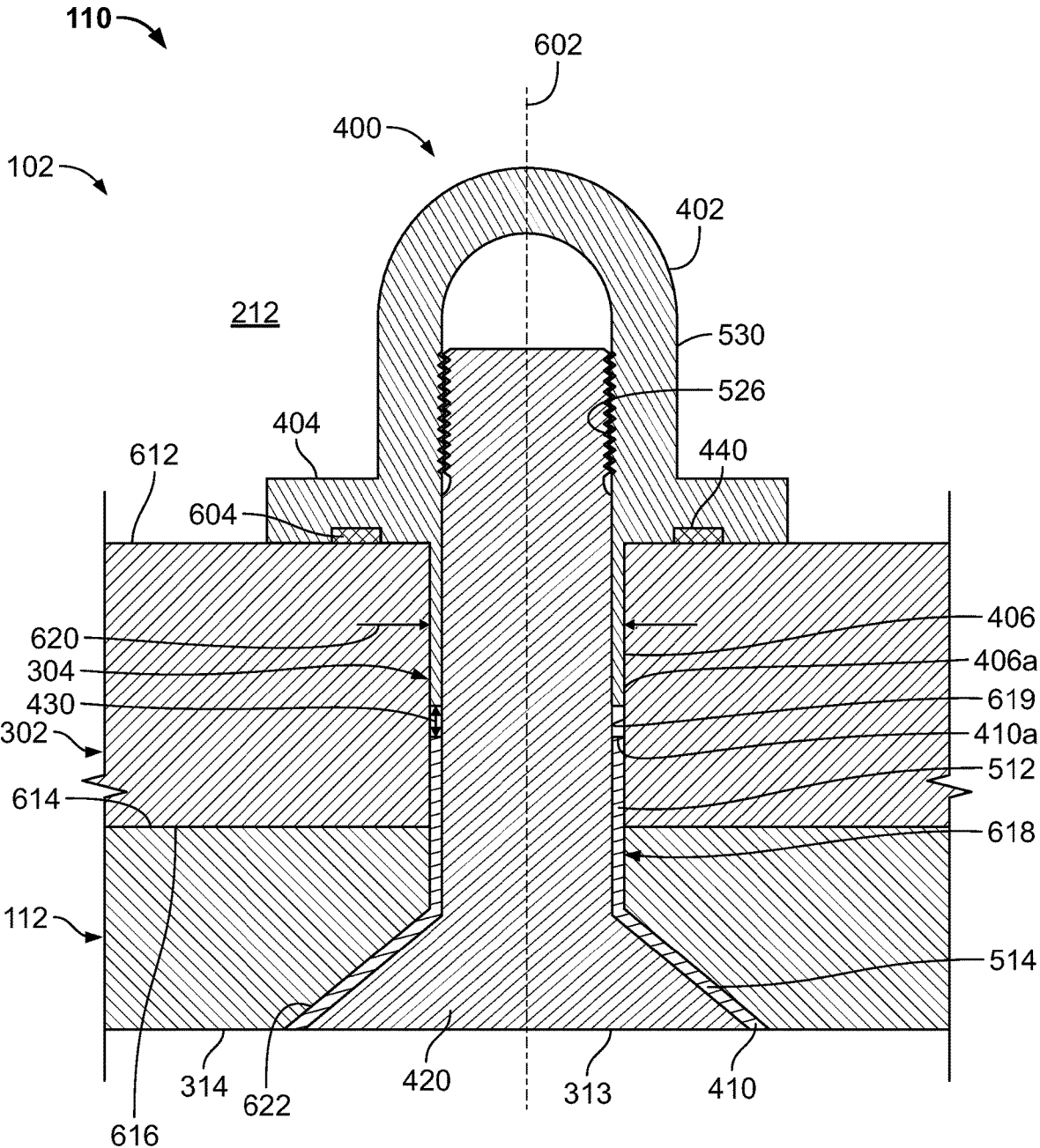
FIG. 6 is a cross-sectional, front view of the example fastening system of FIGS. 4A and 4B coupled to the example wing of FIGS. 1 and 3A-3B.

FIG. 6 is a partial, cross-sectional side view of the fastening system 110 and the wing 102 of FIG. 3B. Specifically, the fastening system 110 is coupled to the rib 302 and the close-out panel 112 of FIG. 3B. To couple the rib 302 and the close-out panel 112, the nutplate 400 is coupled to the first opening 304 (e.g., a through hole) of the rib 302. The nutplate 400 can be coupled to the rib 302 prior to attachment of the close-out panel 112 to the rib 302. To couple the nutplate to the rib 302, the base sleeve 406 is inserted into at least a portion of the first opening 304 of the rib 302. In particular, the base sleeve 406 is coupled to the first opening 304 via a press-fit connection or interference-fit connection to prevent rotation of the nutplate 400 relative to the rib 302 about a longitudinal axis 602 of the nutplate 400. Thus, the base sleeve 406 provides a self-retention device that prevents rotation of the nutplate 400 relative to the longitudinal axis 602. While the initial outer diameter 538b (FIG. 5B) can be larger than a diameter 620 of the first opening 304 of the rib 302 (e.g., by 0.0010 to 0.0040 inches), after interference fit installation, the outer diameter 538b (FIG. 5B) of the base sleeve 406 matches and/or is substantially equal to the diameter 620 of the first opening 304 of the rib 302. However, when coupled to the first opening 304, the outer diameter 538b (FIG. 5B) of the base sleeve 406 is substantially equal to (e.g., identical) a diameter 620 of the first opening 304. When coupled to the rib 302, the nutplate flange 404 engages a first surface 612 of the rib 302. The first surface 612 of the rib 302 is opposite a second surface 614 of the rib 302 that engages an inner surface 616 of the close-out panel 112 (e.g., opposite the exterior surface 314 of the close-out panel 112). Thus, the first surface 612 of the rib 302 does not engage the close-out panel 112. In other words, the first surface 612 is oriented towards the access openings 220 (FIG. 2A) of the wingbox 200. A seal 604 is positioned in the groove 440 of the nutplate 400 that engages the first surface 612 of the rib 302. The seal 604 provides a tight seal between the first opening 304 of the rib 302 and the cavity 212 of the wingbox 200 when the nutplate 400 is coupled to the rib 302. For example, the seal 604 provides a tight seal and provides spark containment to reduce or prevent sparks from entering the cavity 212 of the wingbox 200 via the first opening 304 from the exterior surface 314 during, for example, a lightning strike event (e.g., that occurs during flight). The dome-shape of the body 402 prevents fluid communication or pathways to the cavity 212, providing additional lighting direct strike protection.

The fastener sleeve 410 couples to (e.g., inserts into) a second opening 618 (e.g., a through hole, a second bore) formed in the close-out panel 112. Specifically, the fastener sleeve 410 is coupled to the second opening 618 from the exterior surface 314 of the close-out panel 112. The second opening 618 aligns (e.g., coaxially aligns) with the first opening 304 of the rib 302. Specifically, the first opening 304 and the second opening 618 form an installation hole 619 (e.g., aperture, bore, etc.) to receive the fastening system 110. The first opening 304 and the second opening 618 of the illustrated example have substantially the same size diameters. Additionally, the fastener sleeve 410 couples to the second opening 618 via a clearance fit. For example, the outer diameter 512b of the top sleeve 512 is slightly less (e.g., one-tenth of an inch less) than a diameter of the second opening 618 (e.g., creating a transition fit). The fastener sleeve 410 enables load transfer between the close-out panel 112, the rib 302, the fastener 420 and/or the other structure(s) or structural components 201 of the wingbox 200. The close-out panel 112 includes a countersink 622 to receive the bottom sleeve 514 of the fastener sleeve 410. The bottom sleeve 514 of the illustrated example is flush mounted relative to the fastener head 313 when the fastener 420 is coupled to the second opening 618.

In the illustrated example, when the fastener sleeve 410 couples to the close-out panel 112, the top sleeve 512 at least partially extends into the first opening 304 of the first structure (e.g., rib 302). However, the first fastener sleeve edge 410a and the base sleeve edge 406a form the gap 430. The gap 430 enables insertion of the fastener sleeve 410 without causing the fastener sleeve 410 to engage the base sleeve edge 406a of the base sleeve 406 and push or move the base sleeve 406 out from the first opening 304 when the fastener sleeve 410 is inserted into the second opening 618. Additionally, the gap 430 is small enough to maintain spark protection. In some examples, the gap 430 can include a liquid or gas sealant (e.g., a non-conductive poly-sulfide sealant) for enhanced lightning direct strike protection.

The fastener 420 is coupled to (e.g., inserted into) the installation hole 619 from the exterior surface 314 of the close-out panel 112. For example, the fastener sleeve 410 and the base sleeve 406 receive (e.g., slidably receive) and guide the fastener 420 toward the nutplate 400. For example, the smaller outer diameter of the threaded portion 526 allows insertion through both sleeves 406, 410. The fastener 420 threadably couples to the nutplate 400 via the threads of the threaded portion 526 of the fastener 420 and the internal threads 530 of the nutplate body 402. As the fastener 420 is rotated about the longitudinal axis 602 to threadably couple to the nutplate 400 and fasten the close-out panel 112 and the rib 302, the nutplate 400 is configured to prevent rotation about the longitudinal axis 602 relative to the rib 302. For example, rotation of the fastener 420 about the longitudinal axis 602 imparts a torque to the nutplate 400. The base sleeve 406, via the press-fit connection with the first opening 304, counteracts the torque applied by the fastener 420 and prevents rotation of the nutplate 400 about the longitudinal axis 602 as the fastener 420 threads to the nutplate 400.

Thus, the base sleeve 406 prevents rotation of the nutplate 400 when applying a torque to the fastener 420. In this manner, the fastener 420 couples to the nutplate 400 from the exterior surface 314 of the close-out panel 112 without requiring a tool or personnel to access the cavity 212 (FIG. 2A) of the wingbox 200 via access openings 220 to react the torque applied to the nutplate 400 by the fastener 420. Thus, the fastening system 110 permits a more efficient assembly process given that the nutplate 400 is configured to fix rotation about the longitudinal axis 602 without requiring a tool to prevent rotation of the nutplate 400 about the longitudinal axis 602 when coupling the fastener 420 to the nutplate 400. Thus, the fastening system 110 disclosed herein significantly reduces manufacturing complexity, time, and costs.

Additionally, as noted above, the dome-shape of the nutplate 400 provides lightning direct strike protection as compared to known nutplates that have multiple parts and thereby multiple points of contact and/or gapping between the parts that create(s) a sparking risk. Further, the one-piece structure provided by the nutplate 400 in combination with the seal 604 contains and isolates any internal sparking from entering the cavity 212 (e.g., a fuel tank environment in the wing 102) via the installation hole 619 in the event of a direct lightning strike on the exterior surface 314 of the close-out panel 112. For example, the one-piece structure provided by the nutplate 400 eliminates the need to provide any additional self-retention components such as rivets that form openings in the rib 302 and/or the nutplate 400 that would otherwise provide a pathway or entrance to the cavity 212 and pose a sparking risk. For example, as noted above, secondary self-retention features such as rivets require additional sealants to cover or seal the openings formed by addition of the secondary self-retention features after installation of a close-out panel. Also, the fastening system 110 is coated with a conductive coating (e.g., indium coating, etc.) to enhance lightning direct strike protection. As such, the fastening system 110 can provide a high-bandwidth path for extreme amounts of current (e.g., 40,000-200,000 amps) to flow with no discontinuities that may otherwise cause sparking. The seal 604 and the nutplate 400 provide a tight fluid seal to prevent fluid and/or sparks from entering the cavity 212 via the installation hole 619 during a direct lightning strike event.

FIGS. 7, 8, 9A and 9B illustrate other example fastening systems 700-900 disclosed herein. Those components of the example fastening systems 700-900 that are substantially similar or identical to the components of the example fastening system 110 described above in connection with FIGS. 1-6 and that have functions substantially similar or identical to the functions of those components will not be described in detail again below. Instead, the interested reader is referred to the above corresponding descriptions. To facilitate this process, similar reference numbers will be used for like structures.

Figure 7:
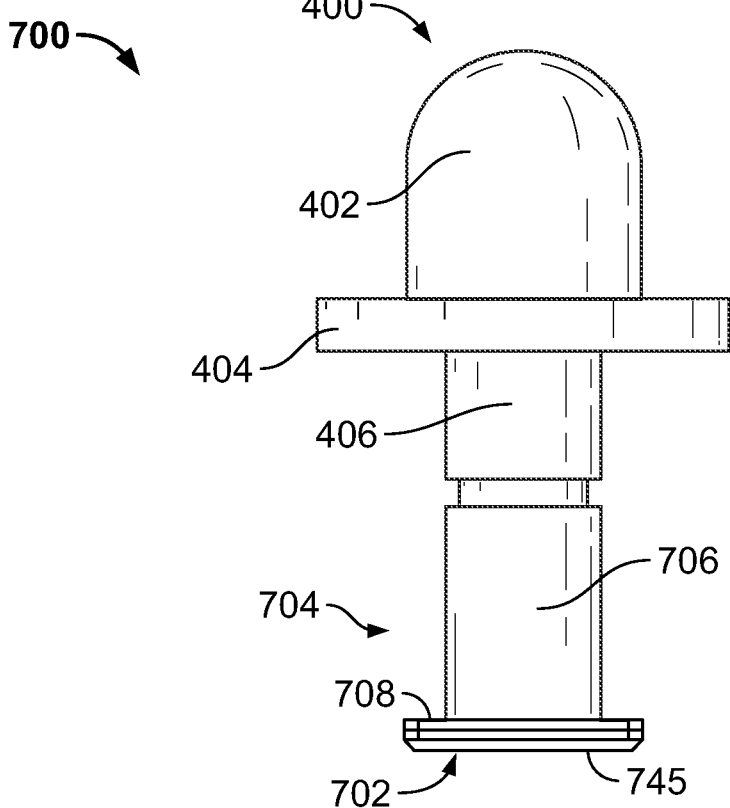
FIG. 7 is an assembled, front view of another example fastening system disclosed herein.

FIG. 7 is a side view of the example fastener 700. Referring to FIG. 7, the fastening system 700 of the illustrated example includes a nutplate 400, a fastener 702 and a sleeve 704. The sleeve 704 includes a body 706 having a cylindrical shape and a flange 708. The body 706 has a first end oriented toward the nutplate 400 and a second end opposite the first end (e.g., toward a head 745 of the fastener 702). The sleeve 704 includes an opening (e.g., a through hole) to receive the fastener 702. When coupled to the sleeve 704, a portion (e.g., a fastener head 745) of the fastener 704 protrudes from the sleeve 704 (e.g., from the second end). In other words, the portion of the fastener 702 is visible from an exterior of the fastening system 700 when the fastening system 700 is coupled to a structure. The flange 708 can provide a seat (e.g., a washed) for the fastener head 745. Such a fastener sleeve 704 can be used in applications where a close-out panel is not exposed to air streams. For example, the fastener system 700 can be used in wingbox assemblies where a close-out panel is provided by or coupled to the front spar chord 210a or a rear spar chord 210b. In some such examples, the fastener head 745 protrudes from fastener sleeve 704 and does not affect an airflow stream (e.g., a boundary layer or pattern of the airflow stream) during flight.

Figure 8A:
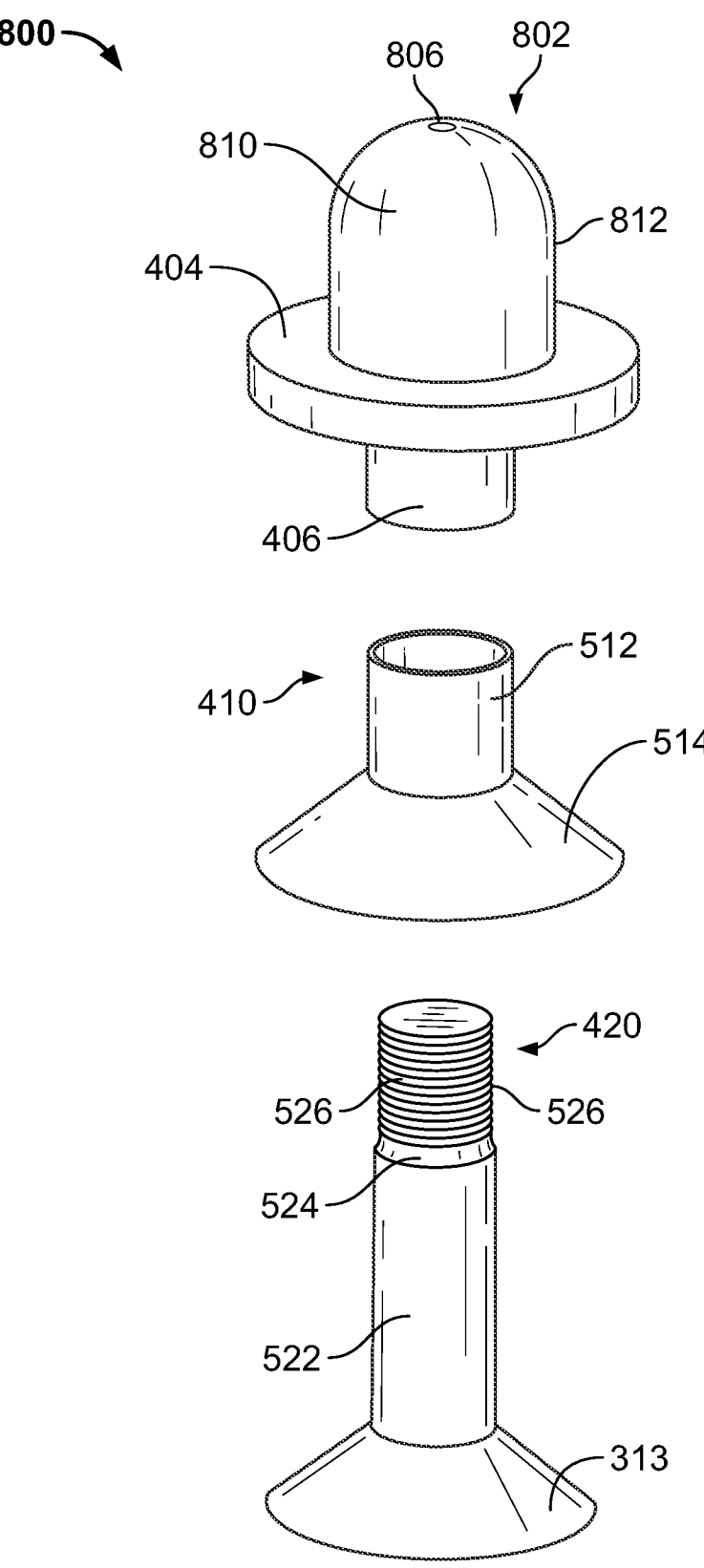
FIG. 8A is an exploded view of another fastening system disclosed herein.
Figure 8B:
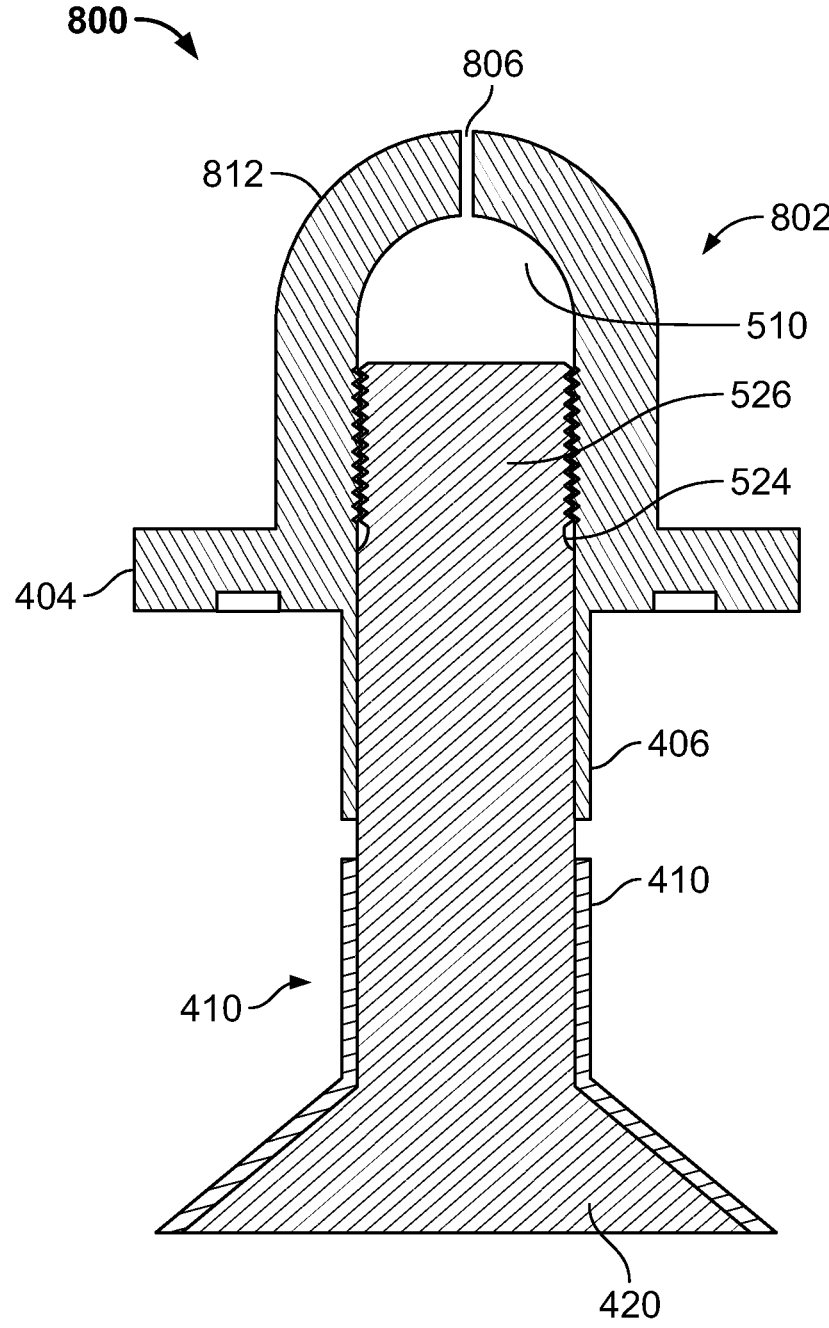
FIG. 8B is an assembled, cross-sectional view of the example fastening system of FIG. 8A.

FIG. 8A is an exploded view of another fastening system 800 disclosed herein. FIG. 8B is an assembled, cross-sectional view of the example fastening system 800 of FIG. 8A. Referring to FIGS. 8A and 8B, the example fastening system 800 includes a nutplate 802, a fastener sleeve 410, and a fastener 420. Similar to the nutplate 400 above, the nutplate 802 includes a domed body 810, a flange 404, a base sleeve 406 and an annular groove 440 to receive a seal (e.g., the seal 604). In addition, the nutplate 802 of the illustrated example includes an opening 806 (e.g., a pin hole or relief opening). The opening 806 forms a relief hole and is provided in an upper area of a body 810 of the nutplate 802. The opening 806 fluidly couple the opening 510 of the nutplate body 810 and an exterior surface 812 of the nutplate body 810. For example, a sealant (e.g., a non-conductive poly-sulfide sealant) can be applied to the fastener 420 and/or the fastener sleeve 410 during installation with the nutplate 802. Excess sealant in the opening 510 can flow through the relief hole (e.g., opening 806). In some instances, sealant remaining in the opening 806 can cure (e.g. solidify) to fluidly seal the opening 510 of the nutplate 802 from the exterior (e.g., the exterior surface 812).

FIG. 9 is a method 900 of coupling the structures (e.g., close-out panel 112 and the rib 302) via the fastening system 110. At block 902, a first structure is aligned with a second structure. For example, referring to FIG. 6, the close-out panel 112 is aligned with the rib 302. At block 904, an installation hole is formed through the aligned structures. For example, the installation hole 619 is formed through the close-out panel 112 and the rib 302 (e.g., the first opening 304 of the rib 302 and the second opening 618 of the close-out panel 112 are formed simultaneously when the close-out panel 112 is aligned with the rib 302). In some examples, the first opening 304 is formed through the rib 302 and the second opening 618 is formed in the close-out panel 112 separately (e.g., prior to aligning or attaching the close-out panel to the rib 302). In some examples, the first opening 304 is preformed with the fabrication of the rib 302 and the second opening 618 is preformed with the fabrication of the close-out panel 112. At block 906, the first structure is removed from the second structure. For example, in the example of FIG. 6, the close-out panel 112 is removed or separated from the rib 302. At block 908, the nutplate 400 is press-fit into the installation hole. For example, the nutplate 400 is press-fit into the first opening 304 of the rib 302. For example, the base sleeve 406 of the nutplate 400 couples to the first opening 304 via an interference fit sufficient to prevent rotation of the body 402 of the nutplate 400 about the longitudinal axis 602 relative to the rib 302. At block 910, the first structure is realigned with the second structure. For example, in the example of FIG. 6, the close-out panel 112 is repositioned on the rib 302 and the first and second openings 304 and 618 are aligned (e.g. coaxially aligned) to provide or define the installation hole 619. At block 912, the fastener sleeve 410 is inserted into the installation hole. For example, the fastener sleeve 410 is inserted into the second opening 618 of the close-out panel 112. Specifically, the fastener sleeve 410 is inserted into the second opening 618 from the exterior surface 314 of the close-out panel 112. At block 914, the fastener 420 is inserted into the installation hole 619. Referring to FIG. 6, the fastener 420 is inserted into the installation hole 619 via the opening of 505 the fastener sleeve 410 and the opening 510 of the base sleeve 406. At block 916, the fastener is coupled (e.g., torqued) to the nutplate 400 to secure or fasten first structure and the second structure. In the example of FIG. 6, the fastener 420 threadably couples to the nutplate 400 to secure or fasten the close-out panel 112 and the rib 302. Specifically, the fastener 420 rotates relative to the nutplate 400, and the base sleeve 406 reacts a torque of the fastener 420 by preventing rotation of the body 402 relative to the fastener 420 and/or the rib 302 about the longitudinal axis 602. As noted above, the press-fit connection between the nutplate 400 and the rib 302 eliminates confined space work that would otherwise need to be performed by an aircraft mechanic to counteract the torque of the fastener 420 as the fastener 420 couples to the nutplate 400.

An example fastening system for aircraft structures is disclosed herein. Further examples and combinations thereof include the following:

Example 1 includes a fastening system to couple a first structure and a second structure, the fastening system including a fastener, a nutplate having a body defining an opening to receive the fastener, a flange extending from the body to engage an outer surface of the first structure, and a first sleeve protruding from the flange in a direction away from the body, the first sleeve to couple to a first bore formed in the first structure and prevent rotation of the nutplate relative to the first structure.

Example 2 includes the system of example 1, further including a second sleeve insertable in a second bore formed in the second structure.

Example 3 includes the system of example 2, wherein the second sleeve couples to the second bore via a clearance fit.

Example 4 includes the system of example 3, wherein the first end of the first sleeve is spaced from the second end of the second sleeve to define a gap when the first sleeve is coupled to the first bore and the second sleeve is coupled to the second bore.

Example 5 includes the system of example 2, wherein a first end of the first sleeve orients toward a second end of the second sleeve when the first sleeve is coupled to the first bore and the second sleeve is coupled to the second bore.

Example 6 includes the system of example 5, wherein the second end of second sleeve at least partially extends in the first bore of the first structure when the second sleeve is coupled to the second bore of the second structure.

Example 7 includes the system of example 2, wherein the first sleeve has a first outer diameter and the second sleeve has a second outer diameter, wherein the first outer diameter is substantially equal to the second outer diameter when the first sleeve is positioned in the first bore and the second sleeve is positioned in the second bore.

Example 8 includes the system of example 7, wherein the first sleeve defines a first inner diameter and the second sleeve defines a second inner diameter, wherein the first inner diameter is substantially equal to the second inner diameter when the first sleeve is positioned in the first bore and the second sleeve is positioned in the second bore.

Example 9 includes the system of example 1, wherein the body of the nutplate is dome-shaped.

Example 10 includes the system of example 1, wherein the first sleeve has a first outer diameter that is greater than a first inner diameter of the first bore prior to the first sleeve being coupled to the first bore.

Example 11 includes the system of example 10, wherein the first sleeve is coupled to the first bore via a press-fit connection to prevent rotation of the nutplate relative to the first structure.

Example 12 includes an aircraft comprising a wingbox defining a structure including one or more spar chords, stringers and ribs, a close-out panel to close the wingbox, and a fastener assembly to couple the close-out panel and the wingbox, the fastener assembly including a nutplate having a body and a first sleeve extending away from the body in a direction along a longitudinal axis of the body, the first sleeve to be press-fit in a first bore of the structure to prevent rotation of the nutplate relative to the structure, the nutplate configured to prevent rotation of the nutplate about the longitudinal axis relative to the structure when the nutplate is coupled to the structure, and a fastener to couple to the nutplate via a second bore formed in the close-out panel to couple the close-out panel and the structure.

Example 13 includes the aircraft of example 12, wherein the nutplate has a first sleeve extending from the body in a direction along the longitudinal axis, the first sleeve to be press-fit in the first bore to prevent rotation of the nutplate relative to the structure.

Example 14 includes the aircraft of example 12, wherein the fastener threadably couples to the nutplate.

Example 15 includes the aircraft of example 12, further including a second sleeve positioned in the second bore prior to coupling the fastener to the nutplate.

Example 16 includes the aircraft of example 15, wherein first sleeve is integrally formed with the body of the nutplate.

Example 17 includes a method comprising aligning a close-out panel of an aircraft with a structure of an aircraft, forming a bore through the close-out panel and the structure, removing the close-out panel from the structure after forming the bore, inserting a nutplate to a first portion of the bore formed in the structure, inserting a sleeve in a second portion of the bore formed in the close-out panel, inserting a fastener in the second portion of the bore formed in the close-out panel from an exterior surface of the close-out panel, and coupling the fastener to the nutplate via the second portion of the bore to secure the close-out panel to the structure.

Example 18 includes the method of example 17, further including applying a torque to the fastener via an exterior surface of the close-out panel.

Example 19 includes the method of example 17, wherein inserting the nutplate to the first portion of the bore includes press fitting the nutplate in the first portion of the bore.

Example 20 includes the method of example 19, wherein press-fitting the nutplate includes press-fitting a second sleeve of the nutplate in the first portion of the bore.

Although certain example methods, apparatus and articles of manufacture have been described herein, the scope of coverage of this disclosure is not limited thereto. On the contrary, this disclosure covers all methods, apparatus and articles of manufacture fairly falling within the scope of the claims.

What is claimed is:

1. A fastening system to couple a first structure and a second structure, the fastening system including:

a fastener having a threaded portion;

a nutplate having:

a body defining an opening to receive the fastener, the opening having internal threads to threadably receive the threaded portion of the fastener;

a flange extending from the body to engage an outer surface of the first structure;

a first sleeve protruding from the flange in a direction away from the body, the first sleeve to couple to a first bore formed in the first structure, the first sleeve, when positioned in the first bore, to prevent rotation of the nutplate relative to the first structure; and a second sleeve insertable in a second bore formed in the second structure, wherein a first end of the first sleeve and a second end of the second sleeve opposing the first end of the first sleeve define a gap to enable the first end of the first sleeve to be spaced apart from the second end of the second sleeve when the first sleeve is coupled to the first bore and the second sleeve is coupled to the second bore, the gap to enable insertion of the first sleeve in the first bore and the second sleeve in the second bore without contact between the first sleeve and the second sleeve.

2. The system of claim 1, wherein the second sleeve couples to the second bore via a clearance fit.

3. The system of claim 1, wherein the first end of the first sleeve is oriented toward the second end of the second sleeve when the first sleeve is coupled to the first bore and the second sleeve is coupled to the second bore.

4. The system of claim 3, wherein the second end of second sleeve at least partially extends in the first bore of the first structure when the second sleeve is coupled to the second bore of the second structure.

5. The system of claim 1, wherein the first sleeve has a first outer diameter and the second sleeve has a second outer diameter, wherein the first outer diameter is substantially equal to the second outer diameter when the first sleeve is positioned in the first bore and the second sleeve is positioned in the second bore.

6. The system of claim 5, wherein the first sleeve defines a first inner diameter and the second sleeve defines a second inner diameter, wherein the first inner diameter is substantially equal to the second inner diameter when the first sleeve is positioned in the first bore and the second sleeve is positioned in the second bore.

7. The system of claim 1, wherein the first sleeve has a first outer diameter that is greater than a first inner diameter of the first bore prior to the first sleeve being coupled to the first bore.

8. The system of claim 7, wherein the first sleeve is coupled to the first bore via a press-fit connection to prevent rotation of the nutplate relative to the first structure.

9. The system of claim 1, wherein the first structure is a close-out panel of an aircraft and the second structure is a wingbox of an aircraft.

10. The system of claim 1, wherein the body includes a dome-shaped region.

11. The system of claim 1, further including a sealant positioned in the gap.

12. The system of claim 1, wherein the gap prevents the second sleeve from pushing the first sleeve out of the first bore when the second sleeve is positioned in the second bore.

13. The system of claim 10, wherein the internal threads are positioned between the flange and a tip of the dome-shaped region.

14. The fastener assembly of claim 1, wherein the gap between the first sleeve and the second sleeve is to at least one of prevent the first sleeve from moving the second sleeve out from the second bore when the first sleeve is inserted in the first bore or prevent the second sleeve from moving the first sleeve out from the first bore when the second sleeve is inserted in the second bore.

* * * * *